United States Patent
Poi et al.

(10) Patent No.: US 8,196,092 B2
(45) Date of Patent: Jun. 5, 2012

(54) XSL DIALOG MODULES

(75) Inventors: Parind Poi, Coppell, TX (US); Prashant Kamath, Irving, TX (US)

(73) Assignee: Verizon Patent and Licensing Inc., Basking Ridge, NJ (US)

( * ) Notice: Subject to any disclaimer, the term of this patent is extended or adjusted under 35 U.S.C. 154(b) by 1391 days.

(21) Appl. No.: 11/818,563

(22) Filed: Jun. 14, 2007

(65) Prior Publication Data

US 2008/0313606 A1 Dec. 18, 2008

(51) Int. Cl.
*G06F 9/44* (2006.01)
(52) U.S. Cl. ........ 717/106; 717/102; 717/107; 717/114; 715/235; 715/237; 455/415
(58) Field of Classification Search .................... 717/106
See application file for complete search history.

(56) References Cited

U.S. PATENT DOCUMENTS

| | | | | |
|---|---|---|---|---|
| 6,446,256 | B1 * | 9/2002 | Hyman et al. | 717/143 |
| 6,886,046 | B2 * | 4/2005 | Stutz et al. | 709/246 |
| 6,996,800 | B2 * | 2/2006 | Lucassen et al. | 717/106 |
| 7,216,351 | B1 * | 5/2007 | Maes | 719/328 |
| 7,260,535 | B2 * | 8/2007 | Galanes et al. | 704/270 |
| 7,512,098 | B2 * | 3/2009 | Jiang et al. | 370/329 |
| 7,610,547 | B2 * | 10/2009 | Wang et al. | 715/205 |
| 7,640,496 | B1 * | 12/2009 | Chaulk et al. | 715/243 |
| 7,707,563 | B2 * | 4/2010 | Wei | 717/140 |
| 7,711,570 | B2 * | 5/2010 | Galanes et al. | 704/277 |
| 2002/0194388 | A1 * | 12/2002 | Boloker et al. | 709/310 |
| 2003/0208743 | A1 * | 11/2003 | Chong et al. | 717/106 |
| 2004/0030993 | A1 * | 2/2004 | Hong Huey et al. | 715/513 |
| 2005/0055321 | A1 * | 3/2005 | Fratkina et al. | 706/45 |
| 2005/0273759 | A1 * | 12/2005 | Lucassen et al. | 717/105 |
| 2006/0276196 | A1 * | 12/2006 | Jiang et al. | 455/446 |
| 2011/0106527 | A1 * | 5/2011 | Chiu | 704/9 |

OTHER PUBLICATIONS

GARP: a tool for creating dynamic Web reports using XSL and XML technologies, author: Guillen, M et al, source: IEEE, dated:Sep. 8, 2003.*

Shared XML Documents in Service Centers of the Futute, author: Schmidt et al, source: IEEE, dated: Jun. 19, 2000.*

* cited by examiner

*Primary Examiner* — Chameli Das

(57) ABSTRACT

A method, system, and computer program product are provided for generating an Extensible Stylesheet Language (XSL) dialog modules (XDM). Voice Extensible Markup Language (VoiceXML) documents operating under voice portal applications employ a series of dialog modules that facilitate operational flow through the application by invoking specific caller-centric events. These dialog modules are divided into two components—XML and XSL dialog modules. The division of the modules causes a clean separation between data (the XML component) and behavior (the XSL component). The XSL component in conjunction with an XML framework operable with the XSL component forms an XDM. Because behavioral aspects remain consistent from application to application, a library of XDMs can be provided to facilitate reuse, thereby minimizing redundancy and reducing development time and cost, and facilitating rapid market entry for organizational products.

22 Claims, 2 Drawing Sheets

XSL DIALOG MODULES

COMPUTER PROGRAM LISTING APPENDIX

A computer program listing appendix stored on compact disc, submitted herewith in duplicate, is provided. Each disc contains the files Confirmation.doc, size 182,784 bytes and created on May 7, 2007; XML Sample.doc, size 224,256 bytes and created on May 7, 2007; VoiceXML Example.doc, size 434,176 bytes and created on May 7, 2007; GlobalXS-LVars.doc, size 198,144 bytes and created on May 7, 2007; and XML Structure.doc, size 52,736 bytes and created on May 25, 2007. The contents of each disc is hereby incorporated by reference in its entirety.

BACKGROUND

VoiceXML is an industry-standard markup language developed by a consortium for building distributed Internet-based voice applications. The language enables Web authors and designers to create applications similar to HTML but with audio functionality. VoiceXML is designed to create audio dialogs with the goal of bringing the advantages of Web-based development and content delivery to interactive voice response applications.

Traditional voice/audio-based applications employ VoiceXML code, which is embedded within a Java Server Pages (JSP) application, to invoke dynamic audio functionality. The resulting JSP file, however, is cluttered with Java code and VoiceXML code and is difficult to debug. Thus, maintenance and testing are problematic. Further, development of a VoiceXML document is a lengthy and time consuming process with code being duplicated from document-to-document to implement various functions. Accordingly, what is needed is an efficient tool to assist developers to rapidly develop VoiceXML applications using reliable and time-tested components in a streamlined manner so that even non-technical personnel can develop voice/audio-based applications.

BRIEF DESCRIPTION OF THE DRAWINGS

The accompanying figures depict certain illustrative embodiments and may aid in understanding the following detailed description. The embodiments depicted are to be understood as exemplary and in no way limiting of the overall scope of the invention. The detailed description will make reference to each of the figures, in which.

Throughout the drawings, like reference numbers refer to like elements, features, and structures.

DETAILED DESCRIPTION OF PREFERRED EMBODIMENTS

Figure 1:
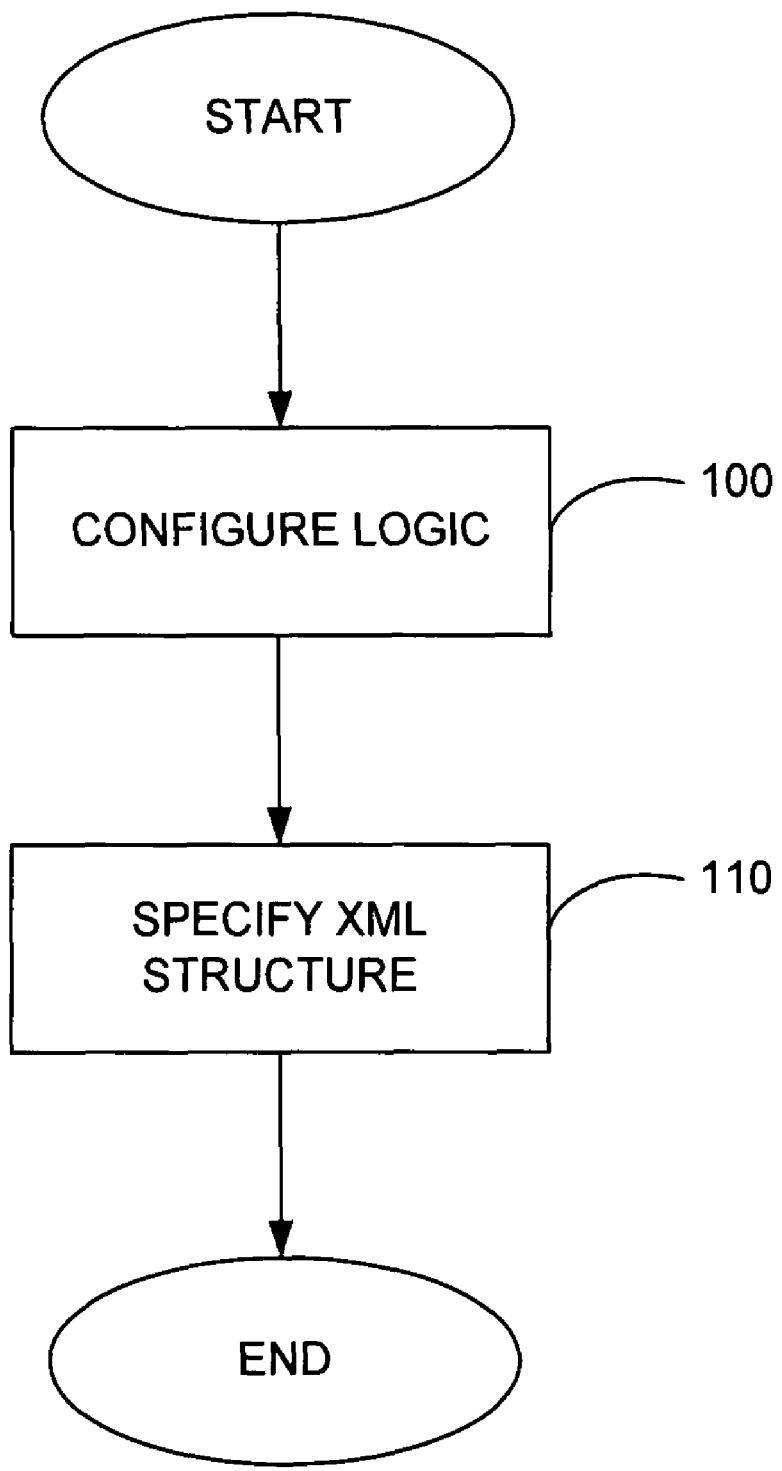
FIG. 1 is a flow chart illustrating the process flow of generating an XSL dialog module (XDM) in accordance with an exemplary embodiment.

The matters exemplified in this description are provided to assist in a comprehensive understanding of various exemplary embodiments disclosed with reference to the accompanying figures. Accordingly, those of ordinary skill in the art will recognize that various changes and modifications of the exemplary embodiments described herein can be made without departing from the spirit and scope of the claimed invention. Descriptions of well-known functions and constructions are omitted for clarity and conciseness.

VoiceXML documents operating under voice portal applications include a series of dialogs that facilitate operational flow through the application by invoking specific caller-centric events. The dialogs are formed of modules that include event classes such as, for example, play prompt modules, branch-on-condition modules, database look-up modules, user input collection modules, and confirmation modules. To simplify the process of forming VoiceXML documents from dialogs, the dialogs are divided into two components—XML and XSL dialog modules. The division of these modules causes a clean separation between data (the XML component) and behavior (the XSL component). Because core behavioral aspects generally do not change from application to application, a library of behavior templates can be developed and made available for reuse in various applications. Each behavior template encapsulates the core behavior for which it was developed. An example of a behavior suitable for a template is getting an address from a caller. As used herein, a "user" can be a human operator or an authorized application, that is, a subscribing program operating automatically with or without human intervention. Usage of the program can be real-time or otherwise.

Behavior templates, which are formed of a set of prompts and conditions, can be characterized as representing an "information providing" state and an "information gathering" state. In an information providing state, appropriate prompts are executed and information is provided based on run-time values and conditions. In an information gathering state, prompts and conditions are employed to request that a user speak something, recognize the spoken language, then return a confirmation of the recognized language.

Behavior templates are formed of XSL templates that can be coupled with an XML skeletal framework or structure to enable subsequent data, that is, the XML component, to operate with the template. By way of example, code for an XML structure is provided in the accompanying computer program listing appendix in the file XML Structure.doc. The XSL template coupled with the XML structure forms an XSL dialog module (XDM). XDMs are reusable and customizable and include XSL template files containing logic inherent to voice applications. XDMs specify an XML structure for an XML file that is used along with an XSL template when generating a VoiceXML file. The XSL template and XML structure conforming an XML specification generate a VoiceXML file for interpretation by a VoiceXML interpreter. Because XDMs address routine core behavior, once developed they can be retained to form a library of reusable software components that is time-tested and reliable. Additionally, because application behavior is localized to the templates, changes and enhancements to library XDMs will be implemented globally.

XSL templates are, generally, oriented toward a particular task and once created rarely require modification. Thus, development of voice portal applications is reduced to the writing of XML files with appropriate prompts, conditions, range of valid inputs (grammar), and other static resources. And as long as the XML data component is correct, the XDM need not be tested on each use. With such a simplification, even non-technical users can write voice portal applications. Such a development tool lends itself ideally to a web-based user interface.

FIG. 1 is a flow chart illustrating the process flow of generating an XSL dialog module (XDM) in accordance with an exemplary embodiment. A method for developing an XDM illustrated by FIG. 1 includes configuring XDM logic, step 100, and specifying an XML structure, step 110. The XML structure can include a predicate framework for forming an XML instance and consists of data and settings that are unique to a particular dialog module. These include various prompts, such as, for example, initial contact, retry, timeout, help, and exit; retry and timeout count, confirmation flags, valid input range for voice and DTMF (grammar), and individual VoiceXML properties.

The XDM logic can include logic inherent to voiceportal applications that allow applications to interact with callers. Such logic anticipates possible user interaction scenarios, and each XDM can be tailored to encompass user interaction where a specific type of input is expected from a caller. Common interaction scenarios include input collection (for example, capturing general text), getting confirmation from a caller (for example, yes/no response), repeats, hang-ups, capture of a 10-digit telephone number, getting an amount paid by the caller (that is, currency), getting a postal address, getting apartment/suite information, and simply executing prompts for the caller. These processing routines and run-time event handling routines should be compatible with a voiceportal application and implementable using different XDMs.

XDM modules can operate in tandem with XML instances for a given dialog and each XDM can be applied to a variety of XML instances of a particular type without necessitating change to the XDM, which facilitates reusability of the XDMs. Thus, since XDM modules are reusable, the XML instance is the only component customized for each dialog, thereby resulting in a savings in development time. Additionally, this development paradigm allows developers to focus their test cases on situations pertaining to a specific XML instance; the developer need not worry about having to test the common voiceportal behaviors in the XDM, which, again, facilitates quick development cycles.

A representative collection of XDMs that serve different caller interactions include, but are not limited to, the following:

getAddress.xsl (which is used to call individual address collection modules as a subdialog);

getAddressStreet.xsl (which is used to collect a street address);

getApartment.xsl (which is used to collect an apartment/suite number);

getAddressConfirmation.xsl (which is used to confirm the address collected);

getCurrency.xsl (which is used to collect currency input from a user);

getDate.xsl (which is used to collect a date);

getDigits.xsl (which is used to collect digits);

getGeneric.xsl (which is used to collect general input based on grammar);

getMultiDigits.xsl (which is used to collect multiple digits);

getNBestGeneric.xsl (which is used for N-Best collection);

confirmation.xsl (which is used for confirmation of input);

playPrompt.xsl (which is used for play prompt UI modules); and playHours.xsl (which is used for playing hours).

By way of example, code for confirmation.xsl is provided in the accompanying computer program listing appendix in the file Confirmation.doc. In support of this XDM, code for GlobalXSLVars.xsl is also provided in the appendix in file GlobalXSLVars.doc. GlobalXSLVars.xsl is a file included by reference in the program code for confirmation.xsl. So called "include" files are modules containing logic and functionality common to a number of XDMs. By locating such common code in a separate file that can be shared amongst XDMs, changes to the code can be made in a single file yet implemented across all XDMs incorporating the code via the include reference.

In order to form a VoiceXML document for each User Interface module, an XSL transformation is applied to the XML instance using an XDM appropriate for the module type. This results in a VoiceXML document that can then be passed to the VoiceXML interpreter to be interpreted and played out to a user. By way of example, code for a VoiceXML document is provided in the accompanying computer program listing appendix in the file VoiceXML Example.doc. This example VoiceXML document is formed from the file XML Sample.doc, provided in the accompanying computer program listing appendix in the file XML Sample.doc, and confirmation.xsl.

Figure 2:
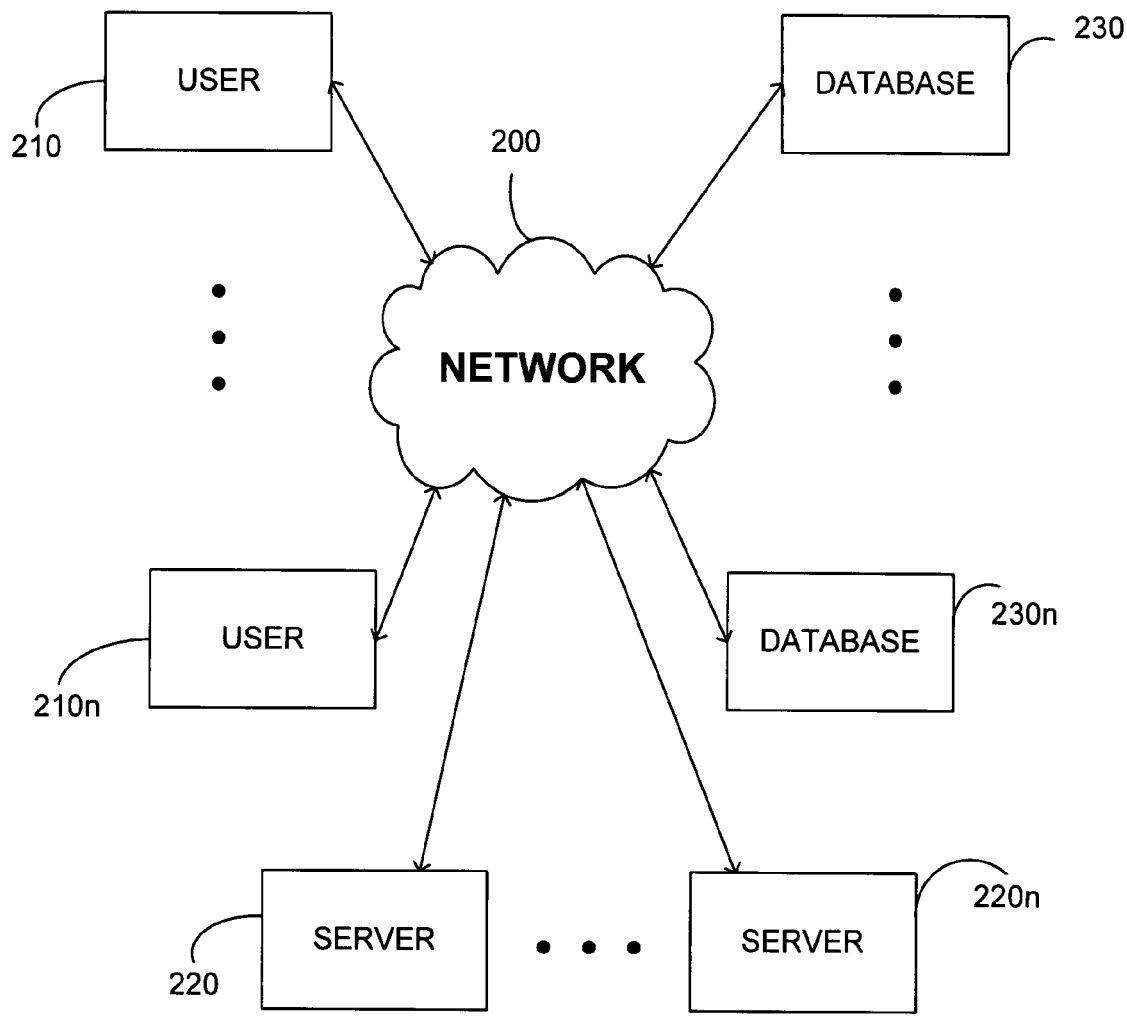
FIG. 2 illustrates an example network in which embodiments of the present system, method and computer program product may be practiced.

FIG. 2 illustrates an example network in which embodiments of the present system, method and computer program product may be practiced. One or more database systems $230 \ldots 230n$ house XDMs that have been prepared for use in developing applications, where n designates the last of a plurality representing the number of database systems employed. Database systems $230 \ldots 230n$ comprise computer data structures stored in computer readable memory such that a computer can manipulate the data structures, or their logical equivalents, such as pointers, to access the XDMs. The database systems $230 \ldots 230n$ may be contained within their own discrete computer or, alternatively, located within the one or more server computers $220 \ldots 220n$, or even within one or more of the user computers $210 \ldots 210n$. The one or more server computers $220 \ldots 220n$ communicate with the at least one database system $230 \ldots 230n$ through the network 200. As with database systems $230 \ldots 230n$, n designates the last of a plurality representing the number systems employed in the server and user computer quantities, $220 \ldots 220n$ and $210 \ldots 210n$, respectively. Users can access database systems $230 \ldots 230n$ directly or through servers $220 \ldots 220n$ via network 200.

In an exemplary embodiment, one or more servers $220 \ldots 220n$ house a computer program product for causing creation of XDMs in a network 200. Although shown as a discrete unit in FIG. 2, exemplary embodiments provide network 200 as encompassing one or more of database systems $230 \ldots 230n$, servers $220 \ldots 220n$, and user computers $210 \ldots 210n$. The computer program product includes computer readable program code stored on a computer readable medium for generating XDMs. The computer readable program code can include code for configuring XDM logic, and computer readable program code for specifying an XML structure. The XML structure can include a predicate framework for forming an XML instance; the XDM logic includes processing routines and run-time event handling routines compatible with a voiceportal application. The computer program product can be configured to operate on one or more server computers $220 \ldots 220n$, and one or more user computers $210 \ldots 210n$.

In another exemplary embodiment, the network system of FIG. 2 further includes an interface. The interface can be operable on one or more user computers and at least one server computer. The interface facilitates requests for generating XML code, the XML code being operable with the XDM to form a VoiceXML file. The interface provides for receiving prompts and conditions appropriate for an information providing state and an information gathering state in response to the request, the appropriate prompts being executed based on run-time values. The interface additionally facilitates generating XML code in accordance with the received prompts and conditions, and returns the generated XML code to the voice portal application, where the XML code is configured to operate with the XDM for inclusion in a VoiceXML document. The interface can be web-based; it can be formed of a program-to-program interface or a graphical user interface (GUI).

As discussed, certain exemplary embodiments can be written as computer-readable code/instructions/programs and can be implemented in digital computers that execute the code/instructions/programs using a computer readable medium. Examples of a computer readable medium include magnetic storage media (for example, ROM, floppy disks, hard disks, among others), random-access memory (RAM), optical recording media for example, CD-ROMs, or DVDs), and storage media such as carrier waves (for example, transmission through the Internet). The computer readable medium can also be distributed over network-coupled computer systems so that the computer readable code/instructions/programs can be stored and executed in a distributed fashion. Further, functional programs, code, and code segments for implementing this disclosure can be easily construed by programmers of ordinary skill in the art to which this disclosure pertains.

While the present application has been particularly shown and described with reference to certain exemplary embodiments thereof, it will be understood by those of ordinary skill in the art that various changes in form and detail may be made therein without departing from its spirit and scope as defined by the appended claims and equivalents thereof.

What is claimed is:

1. A computer program product comprising a computer readable storage medium having stored thereon computer readable code for generating Extensible Stylesheet Language (XSL) dialog modules (XDMs), the computer readable program code comprising:
   computer readable program code for configuring XDM logic;
   computer readable program code for specifying an Extensible Mark-up Language (XML) structure,
      wherein the XML structure comprises a predicate framework for forming an XML instance, and the XDM logic comprises processing routines and run-time event handling routines compatible with a voiceportal application, the run-time event handling routines comprising:
      collecting caller information;
      responding to caller events;
      confirming the caller information; and
      returning the caller information collected to the voiceportal application;
   computer readable program code for receiving a request for generating XML code, the generated code being operable with the XDM;
   computer readable program code for, in response to the request, receiving prompts and conditions appropriate for an information providing state and an information gathering state, the appropriate prompts being executed based on run-time values;
   computer readable program code for generating XML code in accordance with the received prompts and conditions; and
   computer readable program code for returning the generated XML code to the voice portal application, wherein the XML code operable with the generated XDM for inclusion in a voiceXML document.

2. The computer readable program code of claim 1, wherein the voiceportal application facilitates interaction with callers, the interaction comprising input collection, retries, timeouts, repeats, confirmations, and hang-ups.

3. The computer readable program code of claim 1, wherein each XDM generated, serving a different caller interaction, comprises GetDate, GetCurrency, GetDigits, GetGeneric, and GetAddress routines.

4. The computer readable program code of claim 1, further comprising:
   working in tandem with the XML instance, processing the XDM to facilitate logical flow through the voiceportal application,
   wherein the XDM can be applied to a plurality of XML instances of a particular type without change to the XDM.

5. The computer readable program code of claim 1, further comprising:
   computer readable program code for causing the generated XDM to transform the XML instance in forming a VoiceXML document.

6. The computer readable program code of claim 1, wherein the generated XDM operates in tandem with the XML instances including prompts and settings specific to a caller interaction.

7. The computer readable program code of claim 1, wherein the generated XDM is reusable.

8. The computer readable program code of claim 1, further comprising:
   applying an XSL transformation to the XML instance using the generated XDM specific to the XML instance type to form a VoiceXML document.

9. A system operable over a network, the system comprising:
   at least one database system for housing one or more Extensible Stylesheet Language (XSL) dialog modules (XDMs);
   at least one server computer in communication with the at least one database system through the network;
   a computer program product, responsive to a request by one or more user computers through the network, the computer program product comprising a computer readable medium having stored thereon computer readable code for generating XSL dialog modules (XDMs), the computer readable program code comprising:
      computer readable program code for configuring XDM logic;
      computer readable program code for specifying an Extensible Mark-up Language (XML) structure,
         wherein the XML structure comprises a predicate framework for forming an XML instance, and the XDM logic comprises processing routines and run-time event handling routines typical to a voiceportal application, the run-time event handling routines comprising:
         collecting caller information;
         responding to caller events;
         confirming the caller information; and
         returning the caller information collected to the voiceportal application;
   an interface, operable on the one or more user computers and at least one server computer, the interface comprising:
      receiving a request for generating XML code, the generated code being operable with the XDM;
      in response to the request, receiving prompts and conditions appropriate for an information providing state and an information gathering state, the appropriate prompts being executed based on run-time values;

generating XML code in accordance with the received prompts and conditions; and returning the generated XML code to a voice portal application, wherein the XML code is operable with the generated XDM for inclusion in a voiceXML document.

10. The system of claim 9, wherein one or more of the at least one database system is contained within one or more of the at least one server, the database system being responsive to interactions with the computer program product.

11. The system of claim 9, wherein each database system comprises a computer data structure stored in a memory of a computer configured to manipulate the data structure, the computer being responsive to interactions with the computer program product.

12. The system of claim 9, wherein the computer program product is configured to operate on the at least one server computer.

13. The system of claim 9, wherein the computer program product is configured to operate on the one or more user computers.

14. The system of claim 9, wherein the interface operates only on the one or more user computers.

15. A method for developing a VoiceXML application, the method comprising:

configuring, by at least one computer processor, Extensible Stylesheet Language (XSL) dialog module (XDM) logic;

specifying, by the at least one computer processor, an Extensible Mark-up Language (XML) structure, wherein the XML structure comprises a predicate framework for forming an XML instance, and the XDM logic comprises processing routines and run-time event handling routines compatible with a voiceportal application, the run-time event handling routines comprising:

collecting caller information;
responding to caller events;
confirming the caller information; and
returning the caller information collected to the voiceportal application;

receiving a request for generating XML code at an interface, the generated code being operable with the XDM;

in response to the request, receiving prompts and conditions appropriate for an information providing state and an information gathering state, the appropriate prompts being executed based on run-time values;

generating XML code in accordance with the received prompts and conditions; and returning the generated XML code to the voice portal application, wherein the XML code operable with the generated XDM for inclusion in a voiceXML document.

16. The method of claim 15, wherein the voiceportal application facilitates interaction with callers, the interaction comprising input collection, retries, timeouts, repeats, confirmations, and hang-ups.

17. The method of claim 15, wherein each XDM generated, serving a different caller interaction, comprises GetDate, GetCurrency, GetDigits, GetGeneric, and GetAddress routines.

18. The method of claim 15, further comprising:

working in tandem with the XML instance, processing the XDM to facilitate logical flow through the voiceportal application, wherein the XDM can be applied to a plurality of XML instances of a particular type without change to the XDM.

19. The method of claim 15, further comprising:

computer readable program code for causing the generated XDM to transform the XML instance in forming a VoiceXML document.

20. The method of claim 15, wherein the generated XDM operates in tandem with the XML instances including prompts and settings specific to a caller interaction.

21. The method of claim 15, wherein the generated XDM is reusable.

22. The method of claim 15, further comprising:

applying an XSL transformation to the XML instance using the generated XDM specific to the XML instance type to form a VoiceXML document.

* * * * *